United States Patent [19]

Kano et al.

[11] Patent Number: 5,359,617
[45] Date of Patent: Oct. 25, 1994

[54] NONLINEAR OPTICAL DEVICE

[75] Inventors: Satoru Kano, Yokohama; Kiyoshi Kumata; Soichi Owa, both of Tokyo, Japan

[73] Assignee: International Business Machines Corporation, Armonk, N.Y.

[21] Appl. No.: 47,982

[22] Filed: Apr. 19, 1993

[30] Foreign Application Priority Data

Jul. 30, 1992 [JP] Japan .................................. 4-203497

[51] Int. Cl.$^5$ .................................................. H01S 3/19
[52] U.S. Cl. ............................................ 372/45; 372/44; 372/50
[58] Field of Search ............................ 372/45, 44, 50; 359/326, 328

[56] References Cited

U.S. PATENT DOCUMENTS

| | | | |
|---|---|---|---|
| 4,740,976 | 4/1988 | Kajimura et al. | 372/46 |
| 5,045,897 | 9/1991 | Ahlgren | 372/50 |

OTHER PUBLICATIONS

H. Ishiwara, et al., "Silicon/Insulator Heteroepitaxial Structures Formed by Vacuum Deposition of CaF$_2$ and Si" Appl. Phys. Lett. 40 (1), Jan. 1982, American Institute of Physics, pp. 66–68.

G. I. Stegeman, et al., "Waveguides and Fibers for Nonlinear Optics" Journal of the Optical Society of America B, Optical Physics, vol. 6, No. 4, Apr. 1989, pp. 652–662.

E. Rosencher, et al., "Second Harmonic Generation by Intersub-Band Transtions in Compositionally Asymmetrical MQWs", Electronics Letters, vol. 25, No. 16, Aug. 3, 1989, pp. 1063–1065.

M. M. Fejer, et al., "Observation of Extremely Large Quadratic Susceptibility at 9.6–10.8 $\mu$m in Electric–Field–Biased AlGaAs Quantum Amer. Physical Society", vol. 62, No. 9, pp. 1041–1044, Feb. 1989.

T. Yokogawa, et al., "Optical Characterization of ZnSe/ZnS Strained-Layer Superlattices Grown on CaF$_2$ Substrates" Appl. Phys. Lett., vol. 58 (16) Apr. 22, 1991, pp. 1754–1756.

*Primary Examiner*—Rodney B. Bovernick
*Assistant Examiner*—Robert E. Wise
*Attorney, Agent, or Firm*—H. Daniel Schnurmann

[57] ABSTRACT

A multi-quantum well structure with a large second order optical nonlinearity and transparent at short wavelengths of up to 350 nm. is described. Alternating insulator and semiconductor layers are grown on a substrate to form a multi-quantum well structure, such that the potential function for electrons in the semiconductor layers is asymmetric in a direction normal to the substrate. Sub-bands of electrons in the conduction band lead to a large optical nonlinearity with efficient second harmonics generation, and is obtained by an appropriate selection of the width and shape of the well. The structure, preferably packaged on the same substrate of a laser diode, is used as an on-chip source of blue light.

19 Claims, 7 Drawing Sheets

NONLINEAR OPTICAL DEVICE

FIELD OF THE INVENTION

This invention relates to a nonlinear optical device used for wavelength conversion or modulation of input light and, more particularly, to a device that generates coherent light of short wavelengths utilizing a nonlinear optical effect for converting wavelengths of fundamental light.

BACKGROUND OF THE INVENTION

Semiconductor lasers are routinely used in the field of opto-electronics in such diverse areas as optical information processing, optical communication, laser processing, medical treatment and optical measurement. Although GaAs lasers with wavelengths of 780 nm–830 nm (i.e., near the infrared range) are most commonly used today, many applications in the optical industry require that the wavelength of coherent beams emitted by semiconductor lasers be even shorter. Research and development is being promoted to comply with this demand. By way of example, in the field of optical storage, shorter wavelengths are required to increase the storage density of an optical recording medium. For color display, blue is essential. In the field of laser printers, shorter wavelengths mean higher photon energy, which translates into making a relevant chemical reaction more efficient. Consequently, various attempts have been made to generate coherent blue light with wavelengths of 300 nm to 500 nm by combining a semiconductor laser that generates red or near infrared light with wavelengths of 600 nm to 1000 nm, and a wavelength converter that converts the fundamental light wave emitted from a semiconductor laser into light with shorter wavelengths. Such a wavelength converter typically utilizes a second-order optical nonlinearity (second-harmonic generation (or SHG), sum frequency generation, or difference frequency generation) in order to achieve an efficient conversion.

Examples of conventional wavelength converters include inorganic crystals such as KDP, ADP, and $LiNbO_3$. However, such materials do not possess a sufficiently high nonlinearity. Furthermore, a relatively large crystal is necessary to perform wavelength conversion at high efficiency, with the result that it is difficult to reduce the size of the device.

Other examples of wavelength converters include a multi-quantum-well structure, as it is described by M. M. Fejer, S. J. B. Yoo, R. L. Byer, A Harwit, and J. S. Harris, Jr., *Phys. Rev. Lett.* 62, 1041 (1989), and by E. Rosenchef, P. Bois, J. Nagle, and S. DeLaitre, *Electron. Lett.*, 25, 1063 (1989). Reported are the results of experiments in which a multi-quantum-well structure consisting of a GaAs layer and a GaAlAs layer disposed on the substrate is used for converting infrared light (with a wavelength of 10.6 μm). These reports reveal that a multi-quantum-well structure (include the barrier layer and the well layer are made from a III–V compound) has a high nonlinearity. However, a problem exists in that a multi-quantum-well structure is not transparent to light for a wavelength shorter than infrared; it absorbs such a light, with the result that it cannot be used to shorten the wavelength of the coherent light emitted by the semiconductor laser. Moreover, transparency is required for visible light, including blue light, to generate blue light by a second-order optical effect.

OBJECTS OF THE INVENTION

Accordingly, an object of this invention is to provide a nonlinear optical device with a sufficiently high nonlinearity.

Another object of this invention is to provide a nonlinear optical device suitable for generation of blue light.

A further object of this invention is to implement an efficient and compact generator for coherent light with a short wavelength.

DETAILED DESCRIPTION OF THE INVENTION

To obtain an efficient wavelength converter, it is necessary to have a material with a large second order nonlinear susceptibility $\chi^{(2)}$. Additionally, the light absorption of this material should be low in the wavelength regions of near-infrared or red light (600 nm to 1000 nm)—which is the fundamental lightwave, and blue light (300 nm to 500 nm), to generate blue light through wavelength conversion.

To satisfy these requirements, a new multi-quantum-well structure is formed in the material layer disposed on the substrate. An insulator (a I–VII or II–VII compound) is used as the material for the barrier layer, while a semiconductor (III–V or II–VI compound) is used for the well layer.

The multi-quantum-well structure is a multilayer structure in which barrier layers are alternately laminated with well layers, in which each well has a layer thickness of several nanometers to several tens of nanometers. However, the lattice structure of crystals should be continuous in the inside of the well and the barrier layers and also at the interface between both layers, and display little dislocation (i.e., it should form an epitaxial structure).

The multi-quantum well structure is formed at least on a portion of the material layer disposed on a substrate by molecular beam epitaxy (MBE) process, by metal organic chemical vapor deposition (MOCVD) process, or by liquid phase epitaxy (LPE) process. It is essential when growing the crystal not to dislocate the lattice structure of the crystal in the barrier or in the well layer or at the interface between these layers, by controlling the temperature, growth rate, etc. (thereby allowing epitaxial growth). The fact that hetero-epitaxial growth of an insulator and a semiconductor is possible was reported by H. Ishiwara and T. Asano, *Appl. Phys. Lett.*, 40, 66 (1982), and by T. Yokogawa, T. Saitoh, and T. Narusawa, *Appl. Phys. Lett.*, 58, 1754 (1991), even though the structures disclosed therein are not quantum well structures.

Figure 1:
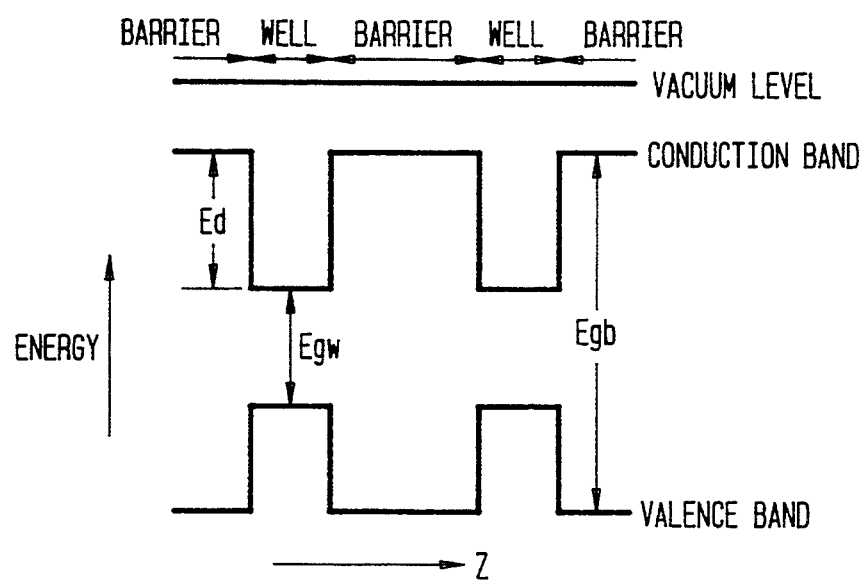
FIG. 1 shows the electronic structure of a multi-quantum-well structure.

When the electronic structure (i.e., the potential function for electrons) in a material is considered, the difference in energy levels between a conduction band and a valence band is called the bandgap or energy gap. In FIG. 1, Egb is the bandgap of the barrier layer, and Egw is the bandgap of the well layer. In the quantum well structure, a well of potential for free electrons is formed in the conduction band, while a well of potential for holes is formed in the valence band. Because electrons in the well of the conduction band affect the generation of blue light by a second-order nonlinear optical effect, the following discussion will focus on the behavior of only these electrons.

Figure 2:
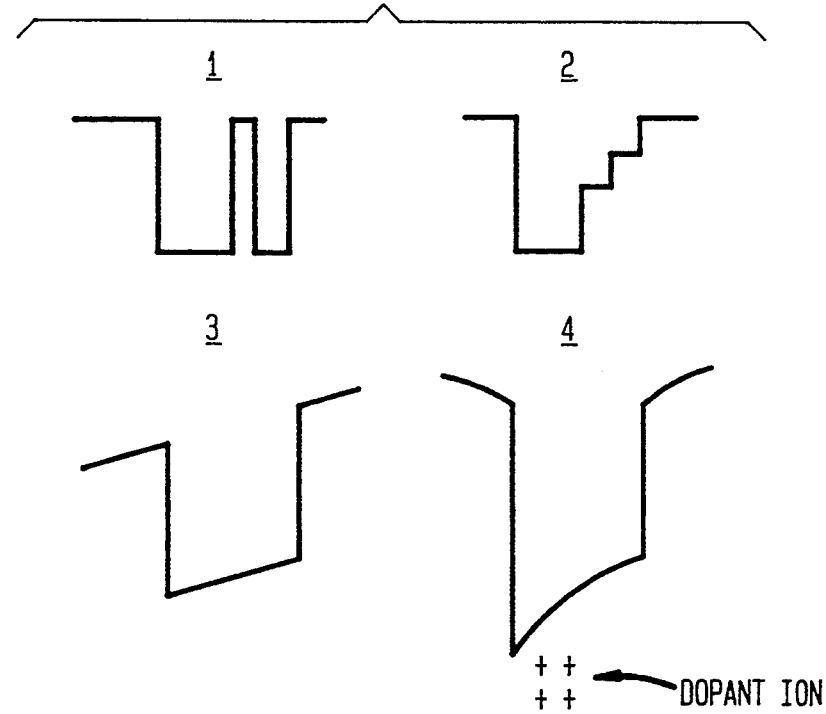
FIG. 2 shows an example of asymmetric potential in the well layer.

The well layer is doped with impurities resulting in the presence of free electrons. The well is formed in a shape that is asymmetric in the direction of the thickness (i.e., normal to the surface of the substrate, hereinafter called the "z-direction"). This condition is required for a second-order nonlinearity. The following are typical known methods for attaining it:

1) The well layers are formed as coupled quantum wells in which well layers are made of the same material but separated by thin barrier layers (see Section 1 of FIG. 2).

2) Each well layer is composed of two or more layers of different materials, and the depth of the well is changed stepwise (see Section 2 of FIG. 2). Alternatively, a well layer is made of a mixture of two or more materials, and the depth of the well is changed by altering the mixing ratio in the z-direction.

3) An external electric field is applied (see Section 3 of FIG. 2).

Figure 4:
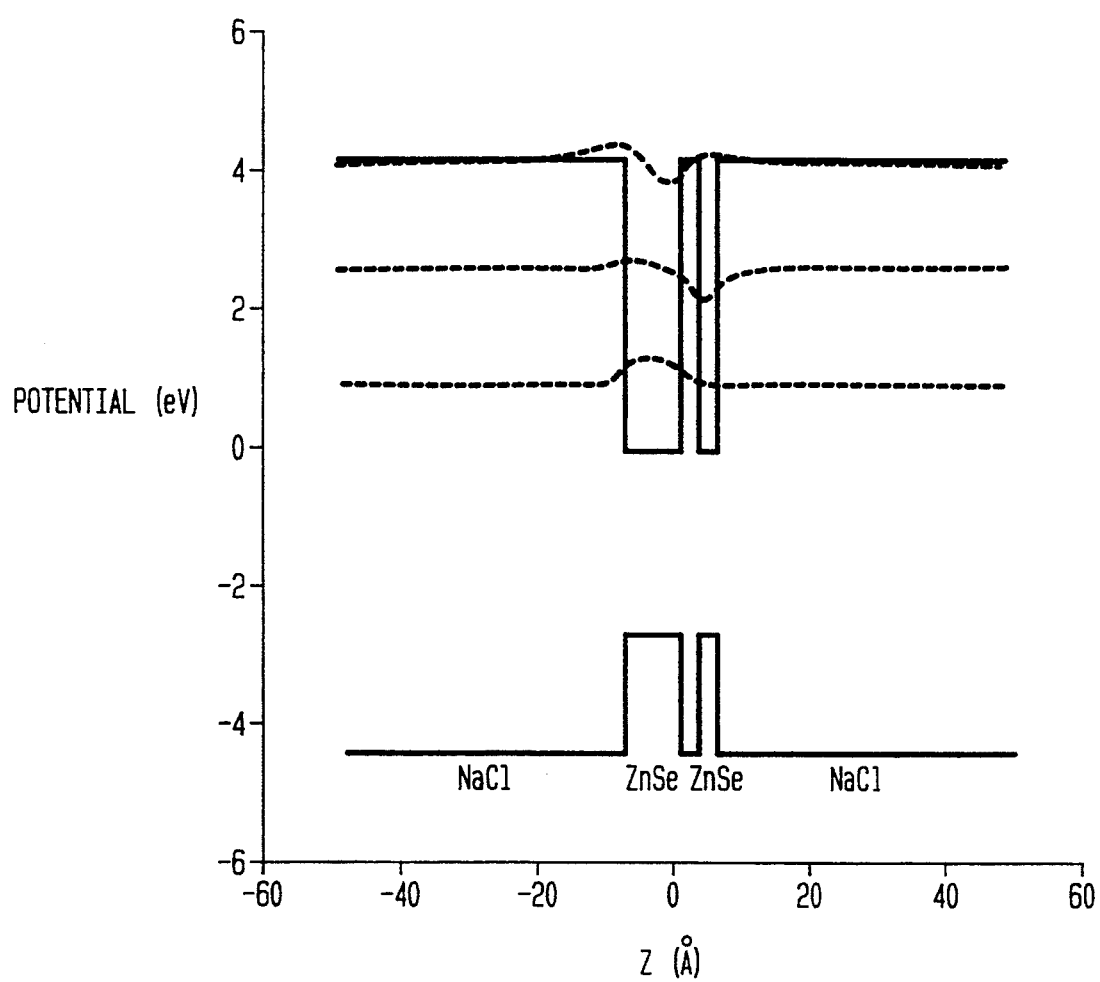
FIG. 4 shows the electronic structure of the well layer, as a first embodiment of the multi-quantum-well structure according to this invention.

4) Impurities are locally doped to internally generate an electric field (see Section 4 of FIG. 4).

Electrons in the well are quantumized so that their energy levels have discrete values and corresponding states (wave functions). The depth of the potential is determined in such a manner that two or more of such different states exist in one well (three or more being best for high nonlinearity), and that the difference in energy level is about the energy level of visible light (1.5 Ev to 3 Ev). To satisfy these requirements, it is necessary that the depth of the well Ed (see FIG. 1) be at least about 3 Ev. A quantum well structure that uses an insulator layer as the barrier layer and a semiconductor layer as the well layer, satisfies the requirements for the depth of the well.

Figure 3:
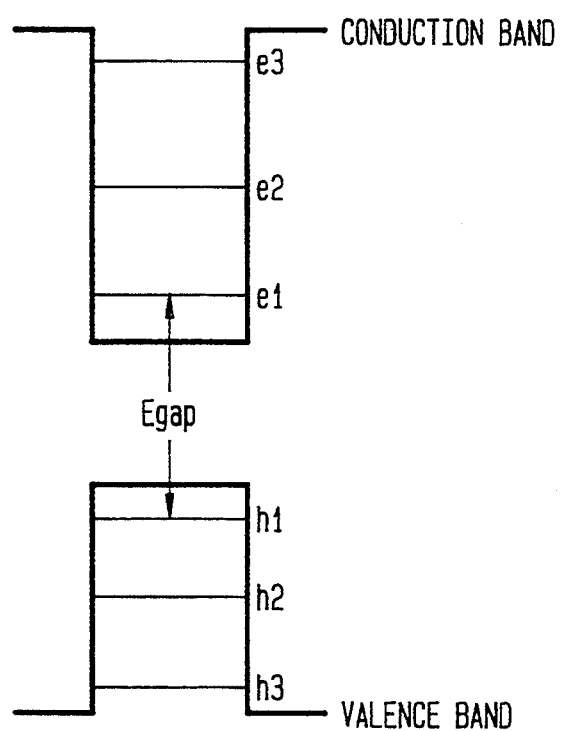
FIG. 3 shows sub-bands in the well layer.

The state of the electrons in a well is called a subband and is schematically illustrated in FIG. 3. E1, e2, and e3 are subbands of the conduction layer, whereas h1, h2, and h3 are subbands of the valence layer. The wave function and the energy level of each subband depends on the width, depth, and shape of the well, and affects both, the second-order nonlinearity and the absorption coefficient. Therefore, values such as the width of the well, are determined by taking these factors into consideration when a well is designed.

If electrons are present in a well, they can be excited by an external light polarized in the z-direction. Transitions between states in the well (inter-subband transitions) tend to prompt a nonlinear optical response. The absorption of light is mainly caused by the transition of electrons from the valence band to the conduction band. To avoid this absorption, it is sufficient that the energy difference Egap in the well layer between the maximum energy level of the valence band and the minimum energy level of the conduction layer be larger than the energy of the light in question. In particular, to avoid absorption of visible light, it is sufficient that this energy difference be at least approximately 3 Ev. This condition is satisfied when a wide-bandgap semiconductor (a II-VI compound or one of several III-V compound semiconductors) is used for the well layer. Although some absorption is caused by the inter-subband transition, it is small enough to be negligible.

No wavelength conversion is caused when the nonlinear optical device is used as an optical modulator. Therefore, it is possible to use a semiconductor with a narrow bandgap (e.g., GaAs) for the well layer.

Several embodiments of this invention will now be explained with reference to FIGS. 4-11.

The design of the multi-quantum-well structure will first be explained in detail. The materials used normally for the barrier layer include I-VII compounds such as LiBr, NaCl, or RbF (including mixtures of them), and II-VII compounds such as $CaF_2$ or $SrF_2$ (including mixtures of them), all of which are insulators. It may also be possible to use mixtures of I-VII compounds and II-VI compounds. The materials used for the well layer include II-VI compounds such as ZnSe or ZnS (including mixtures of them), and III-V compounds such as GaP or AlAs (including mixtures of them), all of which are semiconductors. The materials may also include various mixtures of II-VI compounds and III-V compounds.

FIG. 4 shows a multi-quantum well structure in which NaCl is used as the barrier layer and ZnSe as the well layer. An actual nonlinear optical device should include multiple repetitions of the same unit. The upper solid line indicates the potential function for electrons in the conduction band. The corresponding potential in the valence band is shown by the lower solid line. The well layer is an asymmetrically coupled quantum well in which a NaCl layer having a thickness of 2.82 angstroms is placed between two ZnS layers 8.50 angstroms and 2.83 angstroms thick. The bandgap of the barrier layer is 8.5 Ev, while the well depth of the conduction layer is 4.2 Ev.

The dotted lines show the three possible states (wave functions) of electrons confined in the well. The y-coordinates of the dotted lines indicate the energy levels in those states. They are: 0.9 Ev, 2.6 Ev, and 4.1 Ev, measured from the bottom of the well. An optical nonlinearity is caused by the transition of electrons between the three states. The difference between the maximum energy level of the electrons in the valence band and the minimum energy level of the electrons in the conduction level that includes the ZnSe layer is 3.6 Ev. Thus, a low absorption at the visible light level is obtained.

Figure 5:
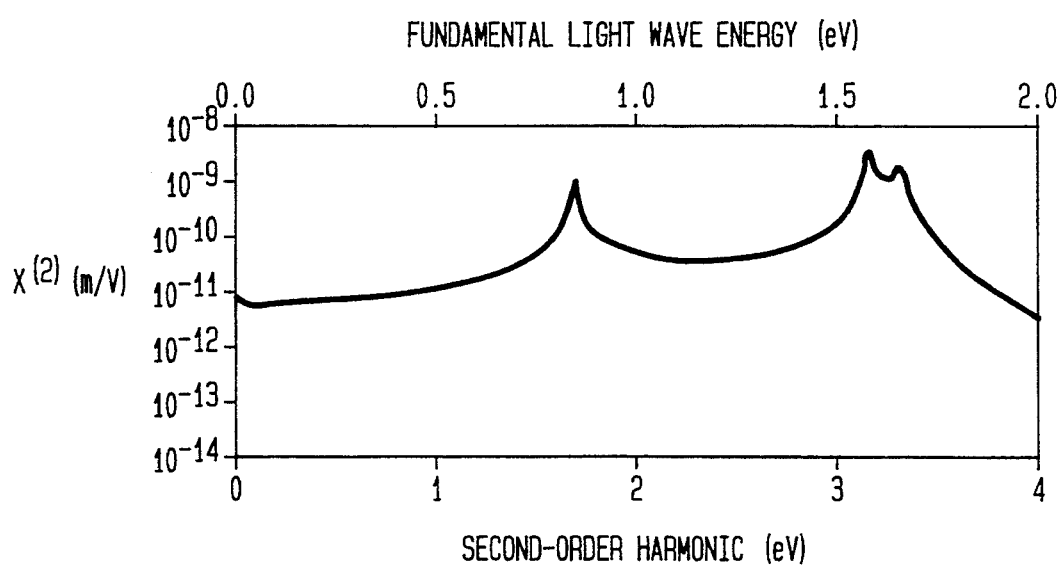
FIG. 5 is a graph showing the theoretical values of the second-order nonlinearity susceptibility $\Omega^{(2)}$ of the multi-quantum-well structure, one unit of which is shown in FIG. 4.

FIG. 5 shows the theoretical value of the second-order nonlinearity susceptibility $\chi^{(2)}$ (the magnitude index of nonlinearity), that affects the generation of a second harmonic for a multi-quantum well structure, a sample of which is the coupled quantum well shown in FIG. 4. Both the fundamental light wave and the second harmonic are polarized in the z-direction. The energy of fundamental light wave being inputted is indicated on the upper abscissa, the energy of the second harmonic being generated is indicated on the lower abscissa, and $\chi^{(2)}$ is indicated on the ordinates. The light emitted from a GaAs laser has a wavelength of 830 nm, corresponding to 1.5 Ev on the upper abscissa. The value of $\chi^{(2)}$ is large even if the fundamental light wave is in the near-infrared or in the red light range, and its maximum value exceeds $10^{-9}$ m/V. In this diagram, the equation shown in the cited reference by M. M. Fejer et al. is used. $2 \times 10^{18}$/cm$^3$ is assumed to be the density of free electrons in the well; 10 the value of local field correction, and $\frac{1}{2}$, the ratio to the entire volume of the quantum well structure in the well layer. (See Y. R. Shen, "The Principle of Nonlinear Optics," *Wiley-Interscience*, New York, (ISBN 0-471-88998-9), p. 23 for the local field correction).

Figure 6:
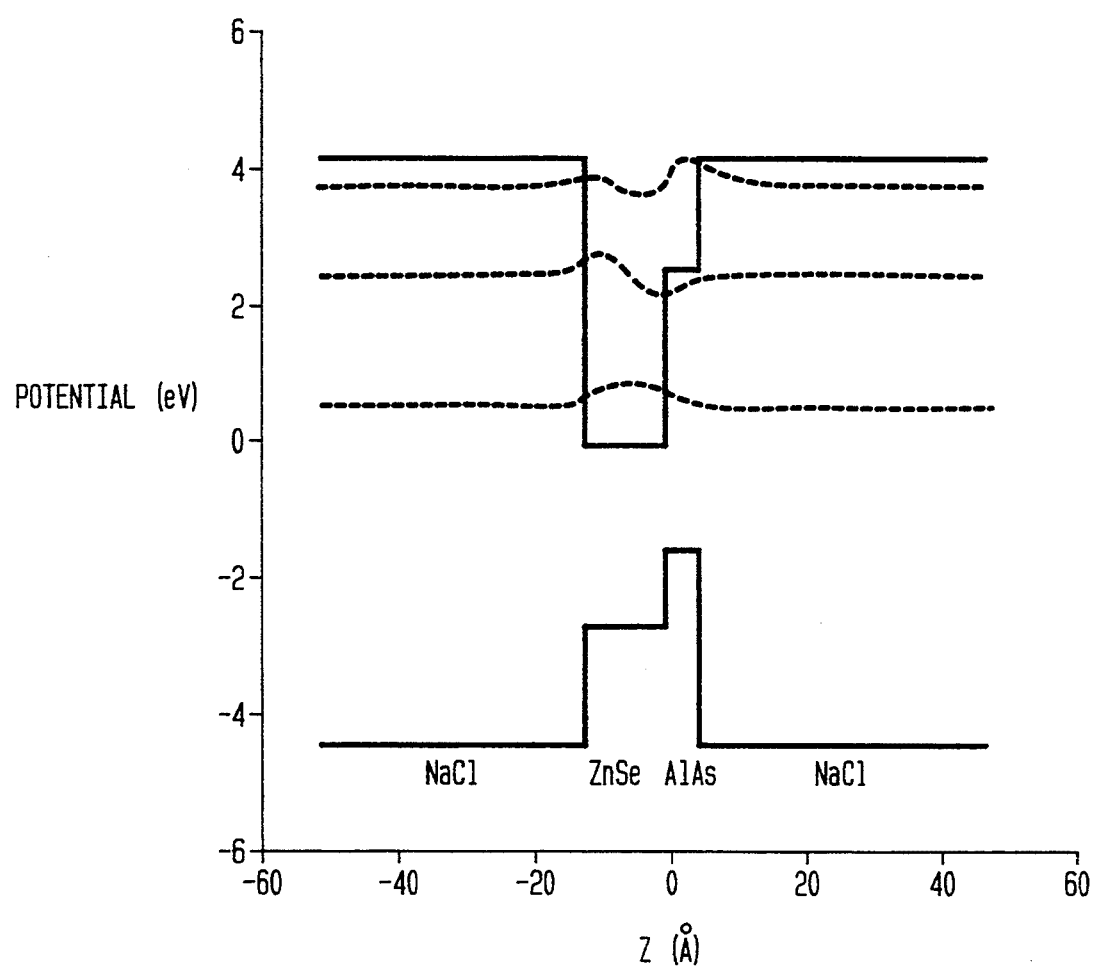
FIG. 6 shows the electronic structure of the well layer as a second embodiment of the multi-quantum-well structure according to this invention.

FIG. 6 is an illustration of a step-depth well structure using NaCl as the barrier layer, and ZnSe and AlAs, as the well layers. The step-depth structure introduces potential asymmetry. Of the well layers, the ZnSe layer has a thickness of 11.3 angstroms, while the AlAs layer is 5.66 angstroms thick. The barrier layer has a bandgap of 8.5 Ev, and the conduction layer, a depth of 4.2 Ev.

The dotted lines show the three possible states (wave functions) of the electrons confined in the well. The y-coordinates of the dotted lines indicate the energy levels in those states. They are: 0.6 Ev, 2.5 Ev, and 3.8 Ev, measured from the bottom of the well. The difference between the maximum energy level of the electrons in the valence band and the minimum energy level of the electrons in the conduction level is 3.3 Ev, even in the ZnSe layer. Thus, low absorption at the visible light level is attained.

Figure 7:
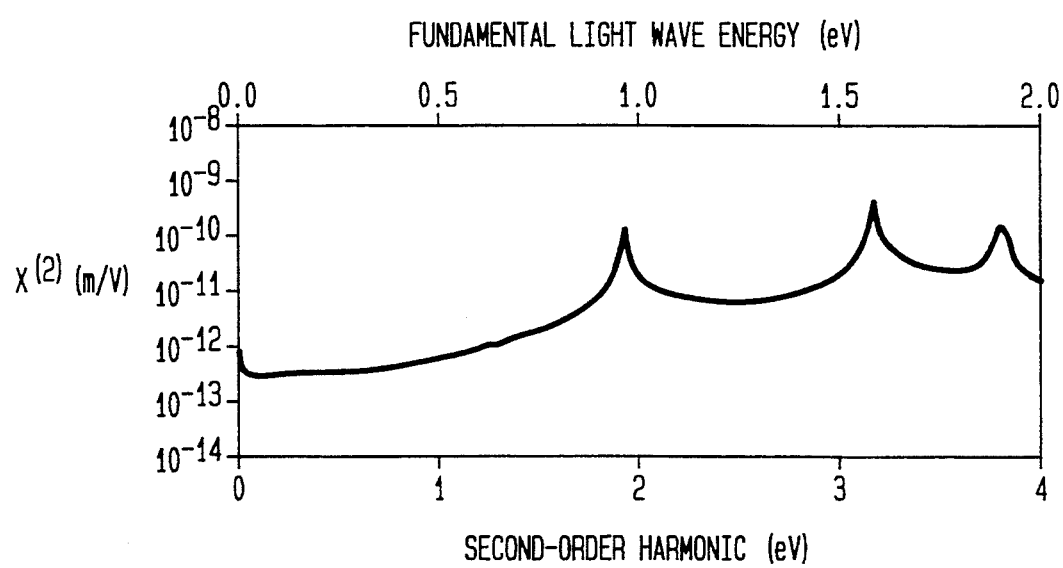
FIG. 7 is a graph showing the theoretical values of the second-order nonlinearity susceptibility $\Omega^{(2)}$ of the multi-quantum-well structure, a unit of which is shown in FIG. 6.

The results shown in FIG. 7 are obtained when $\chi^{(2)}$ is calculated for the multi-quantum well structure (of which this step-depth quantum well is a unit) under the same conditions as those used for the aforementioned coupled quantum well. The maximum value of $\chi^{(2)}$ exceeds $10^{-10}$ m/V.

When the wavelength range of the fundamental light wave is in the near-infrared or red range, $\chi^{(2)}$ is about $10^{-11}$ m/V for inorganic nonlinear crystals such as KDP. Therefore, the above two examples have sufficiently strong nonlinearity to generate light of shorter wavelengths.

Figure 8:
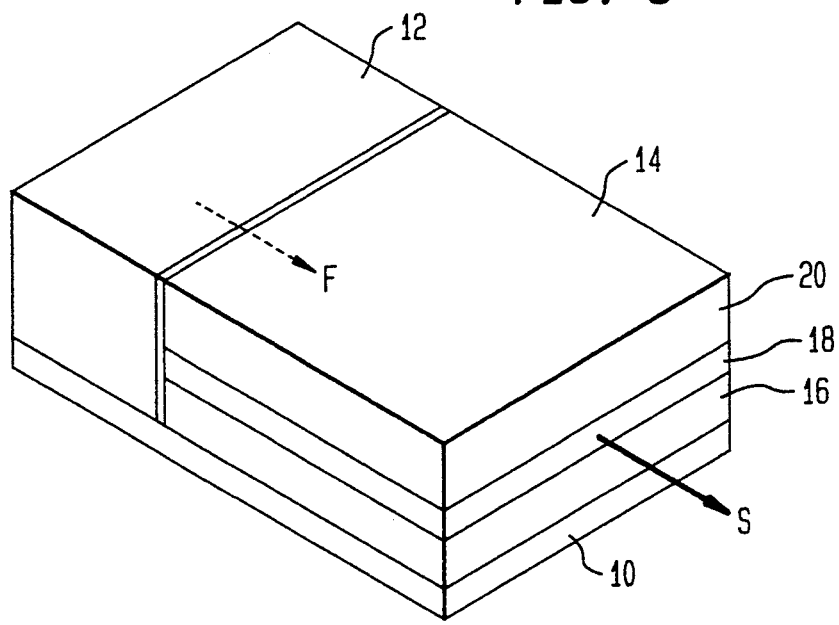
FIG. 8 illustrates a short-wavelength coherent light generator according to this invention.

FIG. 8 shows a preferred compact blue coherent light generator in accordance with this invention. A semiconductor laser 12 emitting red or near-infrared light and a wavelength converter (second-harmonic generator) 14 are formed on a semiconductor substrate 10 doped with impurities. The fundamental light wave F is emitted from the semiconductor laser 12, falls on the wavelength converter 14, and outputs as a second harmonic S. The wavelength converter 14 has a waveguide structure that satisfies phase matching conditions, that is, one in which the fundamental light wave F and the second harmonic S are caused to have substantially the same refractive index in a waveguide layer 18. A multi-quantum-well structure is contained in waveguide layer 18. The waveguide layer 18 is placed between clad layers 16 and 20. Layers 16 and 20 are made of a material that has a refractive index lower than that of the waveguide layer 18. The length of one side of the entire device shown in FIG. 8 is kept at several millimeters or less. It may be possible to mount a holding stand (not shown) to protect the substrate 10 and to facilitate heat radiation from it. In addition, it may also be possible to house all the elements shown in FIG. 4 and the holding stand in an enclosure (not shown).

Figure 9:
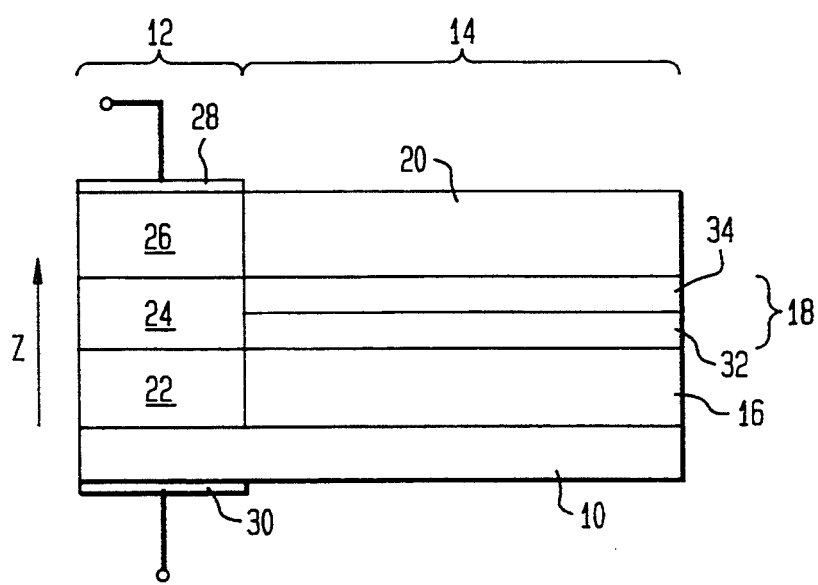
FIG. 9 is a sectional view of the coherent beam generator.

FIG. 9 shows an embodiment of the coherent light generator. The semiconductor laser 12 is a known GaAs laser that contains an AlGaAs layer 22, a GaAs layer 24, an AlGaAs layer 26, and an Au electrode layer 28 formed on one surface of the GaAs substrate 10. It also includes an Au electrode layer 30 formed on the opposing surface of the substrate 10. The semiconductor laser 12 has a waveguide structure, from which a coherent beam with a wavelength of 830 nm is emitted. The output beam is polarized in the z-direction (TM mode).

The wavelength converter 14 of the waveguide structure is formed at a position adjacent to the semiconductor laser 12. The design of the waveguide structure is described by G. I. Stegeman and R. H. Stolen, *J. Opt. Soc. Am.* B, 6, 652 (1989). Here, the material of the clad layers 16 and 20 is CaF$_2$. A combination of a multi-quantum well (hereinafter abbreviated as "MQW") layer 32 and a MgO layer 34 is used as the waveguide layer 18. A fundamental light wave with a wavelength of 830 nm is propagated in the TM0 mode, while the second harmonic having a wavelength of 415 nm is propagated in the TM1 mode. The waveguide layer 18 consists of the MQW layer 32 with high nonlinearity and the MgO layer 34 with low nonlinearity, to ensure an efficient wavelength conversion between TM0 and TM1. The positions of the MQW layer 32 and the MgO layer 34 may be reversed vertically.

The MQW layer 32 has a thickness of 234 nm, and includes eighty-two of the units shown in FIG. 4. The thickness ratio of the well layer to the barrier layer is 1:1, leading to a repetition cycle of 28.3 angstroms.

Phase matching conditions are achieved by giving the clad layers 16 and 20 a thickness of at least 1000 nm, and the MQW layer 32 and the MgO layer 34, a thickness of 234 nm. With a set of the refractive index of light at 830 nm (n1) and the refractive index of light at 415 nm (n2), the CaF$_2$ layers 16 and 20 will be (1.43, 1.44), the MQW layer 32 (1.92, 2.06), and the MgO layer (1.73, 1.76). Here is shown a case in which the waveguide layer consists of a dual layer, and the phase is matched between the TM0 mode and TM1 mode. It is also possible to achieve phase matching by other means such as by inverting the potential structure of the well layer with respect to the z-direction cyclically in the direction of the light. This method, called quasi-phase-matching, is discussed by F. A. Hoph and G. I. Stegeman, "Applied Classical Electrodynamics," Vol. 2, *Wiley-Interscience*, New York, (ISBN 0 471 82787-8), pp. 52–54. In this case, the waveguide layer consists of a single MQW layer.

As shown in FIGS. 4 and 5, the MQW layer 32 has a high second-order nonlinearity, and does not absorb light at visible or longer wavelengths. Therefore, the coherent beam emitted from the semiconductor laser 12 is efficiently converted into blue light having one-half its normal wavelength.

The method of manufacturing the device shown in FIG. 9 is briefly explained. Any deposition process, such as vacuum evaporation, may be used for the layers 16, 20, and the MgO layer 34 of the waveguide layer 18. Vacuum evaporation may also be applied to the electrode layers 28 and 30. Either the molecular beam epitaxy (MBE) process, the metal organic chemical vapor deposition (MOCVD) process, or the liquid phase epitaxy (LPE) process is used for layers 22, 24, 26, and the MQW layer 32 of the waveguide layer, because it is necessary to epitaxially grow alternating insulator and semiconductor layers.

The manufacturing process may be summarized as follows: the layers 22, 24, and 26 are epitaxially grown on the substrate 10 and then removed in part. The layers 16, 18, and 20 of the wavelength converter 14 are then sequentially formed. Alternatively, it may be possible to first produce the wavelength converter 14, a part of which is then etched, to form later the semiconductor laser 12.

Figure 10:
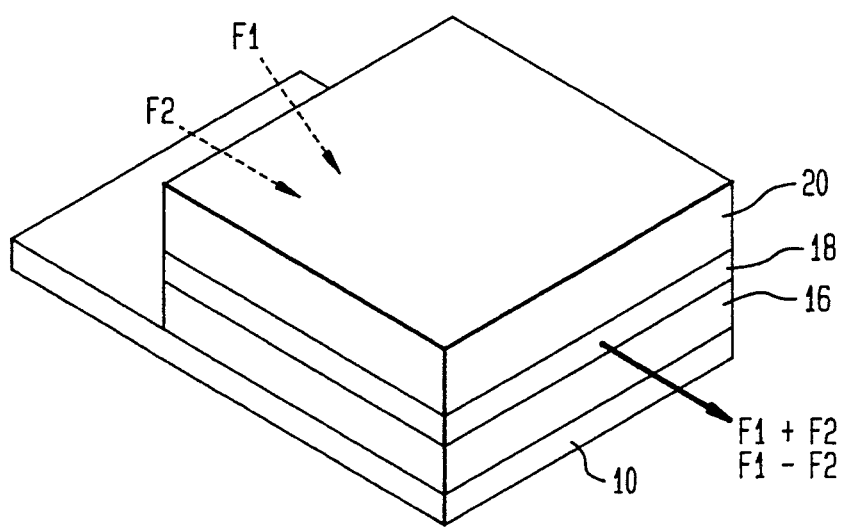
FIG. 10 shows an example of a nonlinear optical device used for wavelength conversion according to this invention.

FIG. 10 shows a structure of the nonlinear optical device according to this invention. The nonlinear optical device is the coherent beam generator from which the semiconductor laser 12 is removed. Clad layer 16, waveguide layer 18 including the MQW layer, and clad layer 20, are also deposited on the substrate 10, although it is not necessary to provide conductivity to the substrate.

In a case where this device is used as a sum or difference frequency generator, two fundamental light waves of different wavelengths and of different frequencies (F1, F2) are directed to the wave guide layer 18 to generate the sum frequency (F1+F2) or the difference frequency (F1−F2). If the device is manufactured such that the MQW layer has the same structure as layer 32 in FIG. 9, the fundamental light wave F1 may be the 830-nm coherent beam outputted by the GaAs laser, and the fundamental light wave F2, the 680-nm coherent beam outputted by the InGaAsP laser. A lens or fiber-optic device (not shown) is used to focus the fundamental light wave on the waveguide layer 18. Adjusting the phase matching conditions with the wave-guide structure determines whether the sum frequency or the difference frequency is generated.

Figure 11:
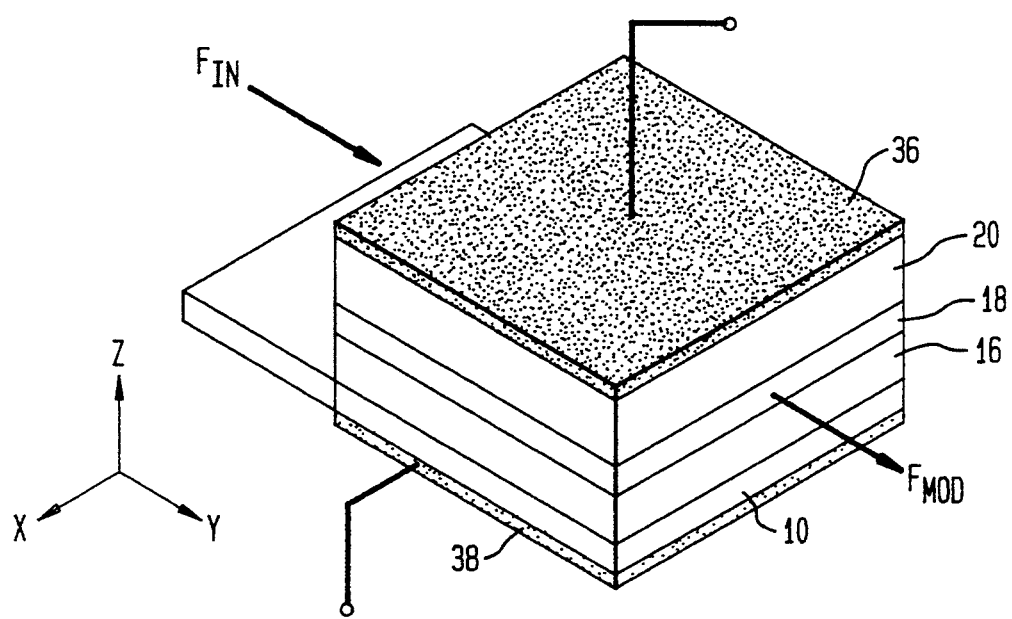
FIG. 11 shows an example of a nonlinear optical device used for light modulation according to this invention.

FIG. 11 shows a preferred embodiment in which the nonlinear optical device according to this invention is used as an optical modulator. This case utilizes the electro-optic effect (Pockels effect) which is an aspect of the non-linear optical effect different from the wavelength conversion. In this device, clad layer 16, waveguide layer 18 (including the MQW layer), and clad layer 20 are laminated onto the substrate 10 to form the waveguide structure. The phase matching conditions need not be considered, because wavelength conversion is not carried out. In addition, the electrode layers 36 and 38 are deposited on the clad layer 20 and on the opposite side of the substrate 10. The waveguide structure is not essential, when it is intended that the electro-optic effect be exercised. It is sufficient that the MQW layer be held between the two electrodes 36 and 38 through which light passes. Therefore, the MQW layer may occupy the entire area between the substrate 10 and the electrode layer 36.

When a voltage, applied between the electrodes 36 and 38, is varied for the light propagating through this modulator and whose polarization is in the z-direction, both the effective refractive index of the light in the waveguide and the effective path length change. Consequently, the phase of the light is also modulated. In FIG. 11, Fin indicates the input light, and Fmod the modulated output light. When the light polarized in the x-direction is mixed further, modulation of the polarization angle becomes possible. Therefore, modulation of the intensity is made possible if an external polarizer is used with the modulator.

Fine tuning of the phase matching can be achieved by using the electro-optic effect when (as shown in FIG. 11) electrodes are mounted on and under the wavelength converter 14 of FIG. 8. This makes it possible to introduce corrections later, even if the dimensions of the waveguide are not very accurate.

A coherent beam with a short wavelength generated by the nonlinear optical device shown in FIG. 10, or by the blue light generator shown in FIG. 8, has possible applications in various fields. In optical storage, the output light can be directed onto an optical storage medium through an optical system having a lens. This improves the storage density without increasing the size of the optical storage device.

As described above, the nonlinear optical device in this invention has a high nonlinearity. In addition, it can efficiently convert near-infrared or red light into blue light. Furthermore, the coherent light generator in this invention is small but can efficiently output light having short wavelengths.

While the novel features of this invention is in terms of preferred embodiments, it will be appreciated that various omissions and substitutions in form may be made by those skilled in the art without departing from the spirit of the invention.

What is claimed is:

1. A nonlinear optical device comprising:
   a substrate, and
   material layers disposed upon said substrate, wherein
   a portion of said layers alternate between insulator layers and semiconductor layers to form a multi-quantum well structure, and wherein
   a potential for electrons in said semiconductor layers is asymmetric in a direction which is normal to said substrate, creating a second order non-linear optical effect.

2. The nonlinear optical device as recited in claim 1, wherein said multi-quantum well structure includes a conduction band having a well depth of at least 3 Ev.

3. The nonlinear optical device as recited in claim 1, wherein a semiconductor layer in said multi-quantum well structure has a conduction band and a valence band provided with electron energy levels, wherein the difference between a minimum energy level of the electrons in the conduction band and a maximum energy level of electrons in the valence band is at least 3 Ev.

4. The nonlinear optical device as recited in claim 1, wherein light inputted into the device having a wavelength of 600 nm to 1000 nm is emitted as output light having a wavelength of 300 nm to 500 nm.

5. The nonlinear optical device as recited in claim 1, wherein said insulator layers are selected from a group consisting of a I-VII compound or a II-VII compound.

6. The nonlinear optical device as recited in claim 1, wherein said semiconductor layers are selected from a group consisting of a II-VI compound or a III-V compound.

7. The nonlinear optical device as recited in claim 1, wherein said material layers have a waveguide layer positioned between two clad layers, said waveguide layer including the multi-quantum well structure.

8. The nonlinear optical device as recited in claim 1, wherein said multi-quantum well structure comprises means for applying voltage in a direction normal to said substrate.

9. A coherent light generator comprising:
a laser device for generating a fundamental light wave, and
a nonlinear optical device coupled to said laser device, said non linear optical device having a multi-quantum well structure, wherein a light wave emitted by said laser device is guided to the multi-quantum well structure of said nonlinear optical device, thereby changing the wavelength of said light wave.

10. The coherent light generator as recited in claim 9, wherein said laser device is a semiconductor laser provided with a light-emitting region.

11. The coherent light generator as recited in claim 10, further comprising a waveguide converter coupled to said semiconductor laser,
the wavelength converter including a waveguide layer positioned between clad layers, which is located opposite to the light-emitting region of said semiconductor laser, and wherein
at least a portion of said material layers alternate between insulator and semiconductor layers to form a multi-quantum well structure, and wherein
a potential for electrons in said semiconductor layers is asymmetric in a direction which is normal to said substrate.

12. The coherent light generator as recited in claim 11, wherein said insulator layers are selected from a group consisting of a I-VII compound or a II-VII compound.

13. The coherent light generator as recited in claim 11, wherein said semiconductor layers are selected from a group consisting of a II-VI compound or a III-V compound.

14. The coherent light generator as recited in claim 10, wherein a semiconductor layer in said multi-quantum well structure has a conduction and a valence band provided with electron energy levels, wherein the difference between a minimum energy level of the electrons in the conduction band and a maximum energy level of electrons in the valence band is at least 3 Ev.

15. The coherent light generator as recited in claim 10, wherein said semiconductor laser emits near-infrared or red light, and said wavelength converter converts said light into blue light.

16. A method of converting fundamental light waves into light of different wavelengths, comprising the steps of:
a) directing a fundamental wave of light into a waveguide layer positioned between two clad layers, said waveguide layer including a multi-quantum well structure, and
b) extracting a second harmonic of said light wave from said waveguide layer.

17. The method of converting fundamental light waves into light of different wavelengths as recited in claim 16, wherein step a) comprises directing two fundamental light waves of different wavelength into the waveguide layer, and wherein step b) comprises extracting a light wave which is the sum or the difference in frequency of the light waves directed into the waveguide layer.

18. The method of converting fundamental light waves into light of different wavelengths as recited in claim 16, further comprising the step of applying a changing voltage to the multi-quantum well structure and further comprising the step of modulating the wave of light directed into the waveguide layer by electro-optic effect.

19. The method of converting fundamental light waves into light of different wavelengths as recited in claim 16, further comprising the step of directing the light wave emitted by the waveguide into an optical recording medium.

* * * * *